No. 792,958. PATENTED JUNE 20, 1905.
W. BAGGER.
SEED PLANTER.
APPLICATION FILED MAY 8, 1905.

Witnesses: Inventor:

No. 792,958. PATENTED JUNE 20, 1905.
W. BAGGER.
SEED PLANTER.
APPLICATION FILED MAY 8, 1905.

Witnesses:

Inventor:
William Bagger

No. 792,958. PATENTED JUNE 20, 1905.
W. BAGGER.
SEED PLANTER.
APPLICATION FILED MAY 8, 1905.

Witnesses: Inventor:
William Bagger.

No. 792,958.

Patented June 20, 1905.

UNITED STATES PATENT OFFICE.

WILLIAM BAGGER, OF WASHINGTON, DISTRICT OF COLUMBIA.

SEED-PLANTER.

SPECIFICATION forming part of Letters Patent No. 792,958, dated June 20, 1905.

Application filed May 8, 1905. Serial No. 259,359.

*To all whom it may concern:*

Be it known that I, WILLIAM BAGGER, a citizen of the United States, residing at Washington, in the District of Columbia, have invented a new and useful Seed-Planter, of which the following is a specification.

This invention relates to seed-planters, and has particular reference to corn-planting machines.

In depositing seeds or grains of corn in the ground it is important that exactly the same number of seeds should be deposited at each operation of the planter or in each hill. To accomplish this purpose, various mechanism more or less intricate has heretofore been employed.

The object of the present invention is to accomplish this result in a uniform and accurate manner; and with this and other ends in view the invention consists in the improved construction, arrangement, and combination of parts, which will be hereinafter more fully described, and particularly pointed out in the claims.

In the accompanying drawings.

Figure 1:
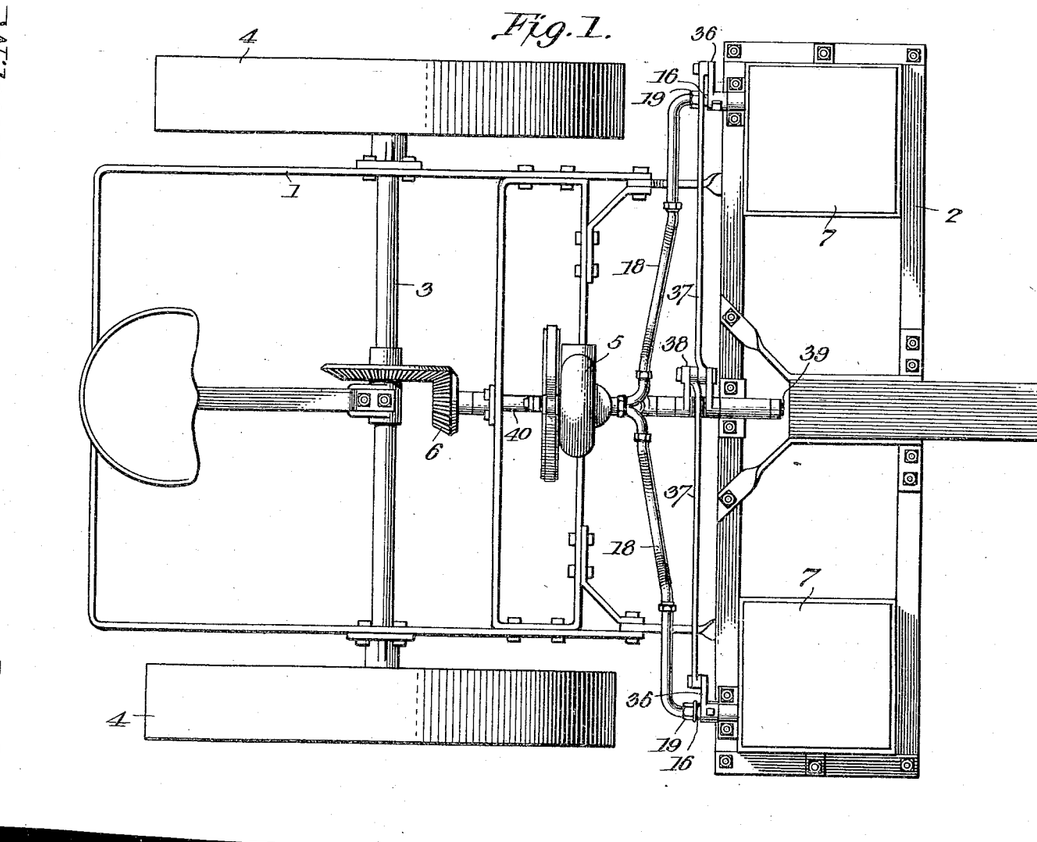
Figure 1 is a plan view of a corn-planter embodying the invention.
Figures 2, 4, 5, 6:
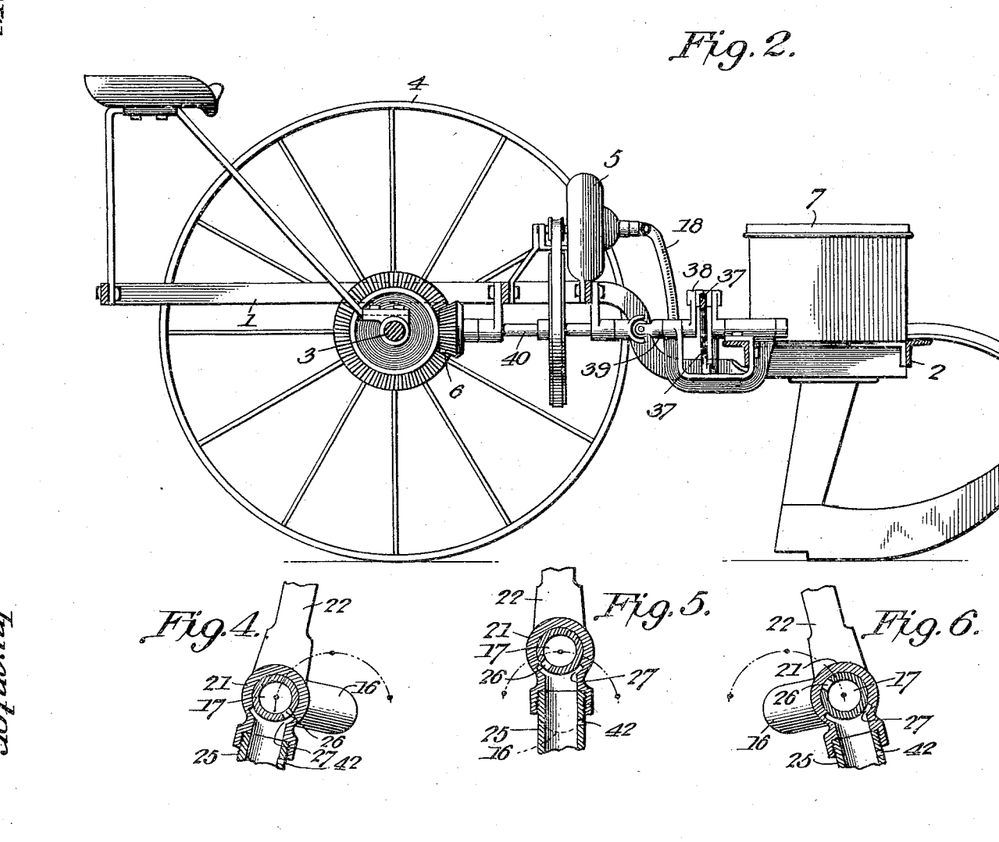
Fig. 2 is a sectional elevation of the same.
Figs. 4, 5, and 6 are sectional detail views showing the pick-up and valve mechanism in its pick-up, intermediate, and discharging positions, respectively.

The present invention is adapted to be used in connection with the frame structure of any modern corn-planter, and the planter-frame has been conventionally illustrated in Figs. 1 and 2, wherein 1 designates the wheel-frame and 2 the runner-frame, the wheel-frame being provided with an axle 3 and transporting-wheels 4. Suitably supported upon the wheel-frame is a fan 5, the shaft of which has been shown as deriving motion from the axle 3 through intermediate speed-gearing 6, whereby the fan may be speeded to establish the requisite suction or blast.

As the mechanism within the hoppers is identical in both hoppers, only one need be described in detail. The hopper designated 7 is provided with a partition 8, spaced from the bottom and dividing the hopper into a seed chamber or reservoir 9 and an auxiliary chamber 10, having a side wall 11, extending upwardly from the bottom and terminating in a plane above the lower edge of the partition 8. The compartment 10 is thus divided into subcompartments 12 and 13, one of which, in this case the compartment 13, communicates directly with the seed-tube 14. The subcompartment 12 is in communication with the seed-compartment 9 through the passage 15 beneath the partition 8, and the subcompartment 12 will thus receive a constant flow of seeds from the compartment 9, whereby an approximately constant level is maintained in said subcompartment 12.

In the compartment 10 is an oscillatory tubular rock-shaft 16, which is provided with a hollow crank 17. The rear end of the tubular shaft 16 extends through the rear wall of the hopper and is connected with the eye of the fan-casing by means of tubing 18, which latter is connected with the rock-shaft by means of a union 19. The crank 17 carries a valve-casing 21, having an upwardly-extending guide member 22, which in Fig. 3 has been shown as provided with a slot 23, engaging a guide pin or rod 24. A pick-up member 25, which depends from the casing 21, may communicate with the interior of the tubular crank through a port 26 in the latter when said port registers with a passage 27, formed in the casing, the relative disposition of the port 26 and the passage 27 being such that when the pick-up member is conveyed by the motion of the crank downwardly into the seed-chamber 12 it shall be opened to the suction set up in the tubular shaft by means of the fan, while when said suction-finger is positioned in the subcompartment 13 above the seed-tube communication between the pick-up member and the interior of the crank will be cut off. The construction is such that the suction is not entirely cut off until the lower end of the pick-up member has passed over the wall 11 and is positioned above the seed-tube 14. This general construction will be readily comprehended by reference to Figs. 4, 5, and 6 of the drawings, in which the crank and the pick-up member have been shown in three different positions—that is to say, dipping into the seed-supply, which may be termed the "first" position; in the vertical plane of the crank, which may be termed the "second" position and in which a degree of suction still exists within the pick-up member, and in the third or discharging position where suction is entirely cut off, the ported crank 17 practically constituting a valve coöperating with the casing 21 to attain the desired results.

Figures 3, 7, 8, 9, 10, 11, 12, 13, 14, 15, 16, 18:
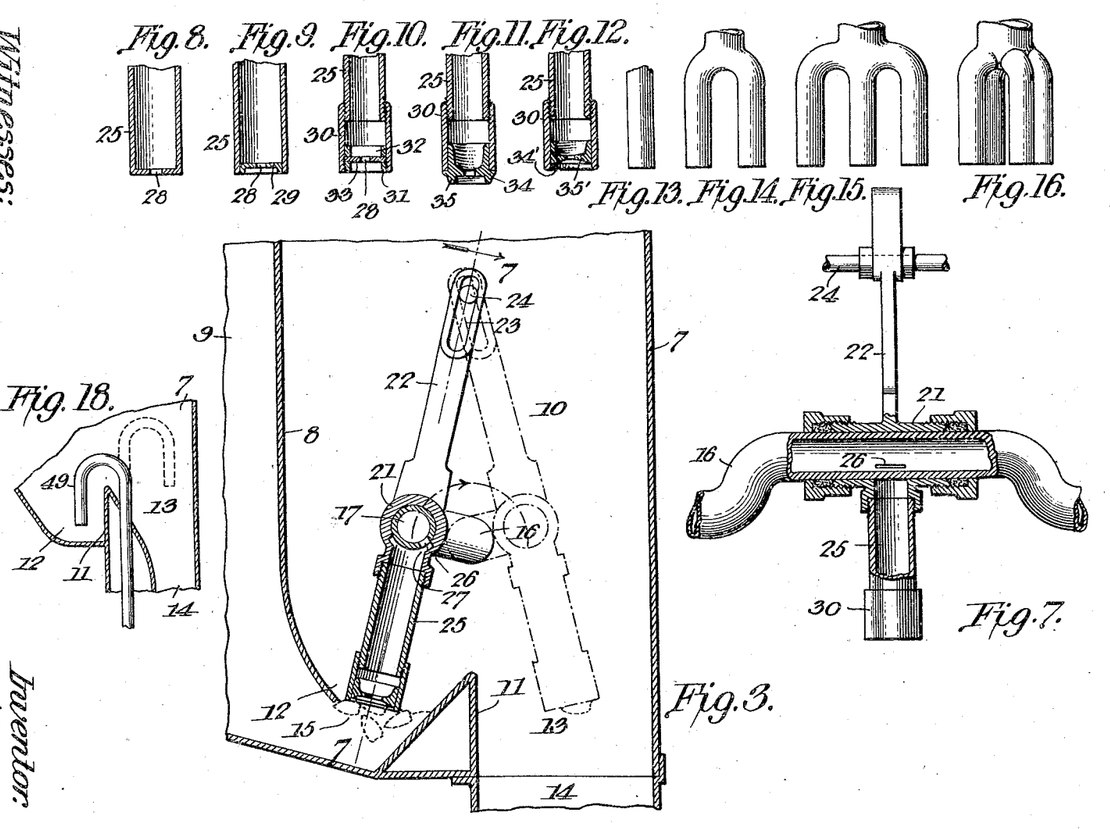
Fig. 3 is a transverse sectional view taken through a portion of one of the hoppers.
Fig. 7 is a sectional view taken on the plane indicated by the line 7 7 in Fig. 3.
Figs. 8, 9, 10, 11, and 12 are sectional views illustrating various forms of the pick-up.
Figs. 13, 14, 15, and 16 are detail views illustrating various modifications of detachable and interchangeable pick-up fingers.
Fig. 18 is a sectional detail view illustrating a further modification of the pick-up mechanism.

The pick-up member 25 may be made of any desired shape and size, the most simple form being that illustrated in Fig. 8, wherein the pick-up is in the form of a tube provided at its lower end with a small opening 28, which serves as a current of air is drawn therethrough to pick up a single grain of corn or other seed, the aperture being of less area than that of the surface of the seed with which it engages, so that only single seeds may be caught.

In Fig. 9 is illustrated a slight modification, in which the pick-up is tubular in form and is provided at its lower end with a flanged disk 29, in which is formed an aperture 28, the disk being disposed somewhat within the end of the tube in order that its flange may form, in connection with the end of the tube, a guard or shield for the pick-up, so that when the latter is forced downward or forward into the mass of seed single seeds will be separated and directed toward the aperture in position to be picked up as air is exhausted in advance of the seed. The diameter of the tube and guard-flange is governed by the size of the seed being operated upon and in most cases is preferably but slightly greater than the largest cross-sectional area of any one seed, so that danger of picking up a plurality of seeds is reduced to a minimum. The shield exercises a further function in that during the withdrawal of the pick-up member it will act to shield the selected seed from contact with the mass of seeds, and thus avoid danger of accidental removal of the seed from the end of the pick-up.

In Fig. 10 is illustrated a further modification of the pick-up member, this form being made specially with a view to renewal in case of wear. The pick-up tube 25 is threaded at its lower end for the reception of a sleeve 30, and the lower end of the sleeve is internally threaded for the reception of a ring 31, between which and an inner ring 32 is clamped a diaphragm 33, formed of rigid or of yieldable material and provided with an aperture 28. In this case also the end of the sleeve and the ring constitute a guard for preventing accidental discharge of a selected seed.

In Fig. 11 is illustrated a still further modification, in which the end of the sleeve carries a plug 34, formed of a yieldable material—such, for instance, as india-rubber or a composition containing rubber—and in this case the guard-flange 35 forms an integral part of the plug.

In Fig. 12 is illustrated a still further modification, in which the plug 34' and its apertured diaphragm 35' are arranged within the lower end of the tube, so that the latter forms a guard-flange or shield, operating in the manner previously described.

It is preferred in all of these constructions that the diaphragm be formed of a yieldable or flexible material in order to prevent injury to the seed and at the same time in order that it may conform to a greater or less extent to the contour of the seed, and thus prevent the entrance of air between a seed and the diaphragm and lessen the likelihood of accidentally dropping the said seed and at the same time rendering it more difficult for a plurality of seeds to become attached to the end of the pick-up, the diaphragm conforming to the shape of a single seed and the latter being directed toward the approximately central aperture.

In machines of this type it is often desirable to plant single seeds or to simultaneously plant two or more seeds, and in order to provide for this the machine is so arranged that the pick-up members may be interchangeable. Each pick-up member may be in the form of a single finger, as shown in Fig. 13, having at its outer end an opening for the entrance of an air-current and arranged to pick up a single seed, or it may be of the form shown in Fig. 14, where twin fingers are shown arranged to pick up two seeds, or the pick-up may be provided with three fingers, as shown in Fig. 15, or four or more fingers, as shown in Fig. 16.

In the manufacture of the machines a set of interchangeable single and plural pick-up fingers is supplied with each machine, so that the user may readily adjust one or the other set of fingers to position in accordance with the character of the work.

The rock-shafts 16, of which two are shown in the present instance, are mounted in suitable bearings at the opposite sides of the runner-frame, and each is provided with a rocker-arm 36, said rocker-arms being connected by links 37 to a crank 38, carried by a crank-shaft 39, attached to suitable bearings at the central portion of the runner-frame and connected by a universal joint to a shaft 40, that is driven from the axle through suitable gear connection, this shaft 40 serving also as a means for transmitting movement to the fan. The operating mechanism shown, however, is merely suggestive of a simple form of mechanism which might be employed for the purpose of transmitting movement to the rock-shaft, and it will be understood that this mechanism will vary in accordance with the character of the machine to which the said selecting mechanism, forming the subject of the invention, is applied, and it will further be understood that the machine may be provided with any of the auxiliary foot-valve or similar mechanisms now employed for controlling the delivery of the seed to proper position in the furrows.

In this construction it is preferred to provide the pick-up member with a perforation 42, located at any convenient point and of such an area that when communication is cut off between the pick-up member and the main suction-tube sufficient air will be admitted to equalize the pressure around the seed and permit the latter to fall by gravity through the seed-tube.

In the operation of the mechanism as thus far described the suction-fan is rotated continuously, and air is constantly drawn through one of the pick-up members or all of them toward the fan so long as the fingers remain in the position shown in Figs. 3 and 4. When in this position, the lower ends of the pick-up members are disposed within the compartment 12 in a position below the level of the mass of seed, having been previously forced down through the mass of seed and separated a single seed, which being guided toward the central aperture of the pick-up member is instantly caught and held by the partial vacuum created within the lower portion of said pick-up member. As the rock-shaft is rotated from the position shown in Fig. 4 to the position shown in Fig. 5 the suction still continues, inasmuch as the pick-up member is still in communication with the hollow crank; but after the pick-up member passes beyond the wall 11, as shown in dotted lines in Fig. 3, the valve-chamber serves to gradually close the port leading through the wall of the crank, and by the time the pick-up member arrives at the position shown in Fig. 7, or the discharging position, the suction will be entirely cut off, the power being closed, and the air-port 42 will then admit sufficient air to the interior of the pick-up member to equalize the atmospheric pressure around the seed at the entrance to the tube and allow the seed to fall. It will be noted that in the discharging position the end of the pick-up member is approximately in the vertical plane of the axis of the seed-tube, so that as the seed is dropped it falls clear of the walls of the tube and will not be retarded in any way by contact with such walls, so that the machine may operate successfully during damp weather.

Figures 17, 19, 20, 21, 22, 23:
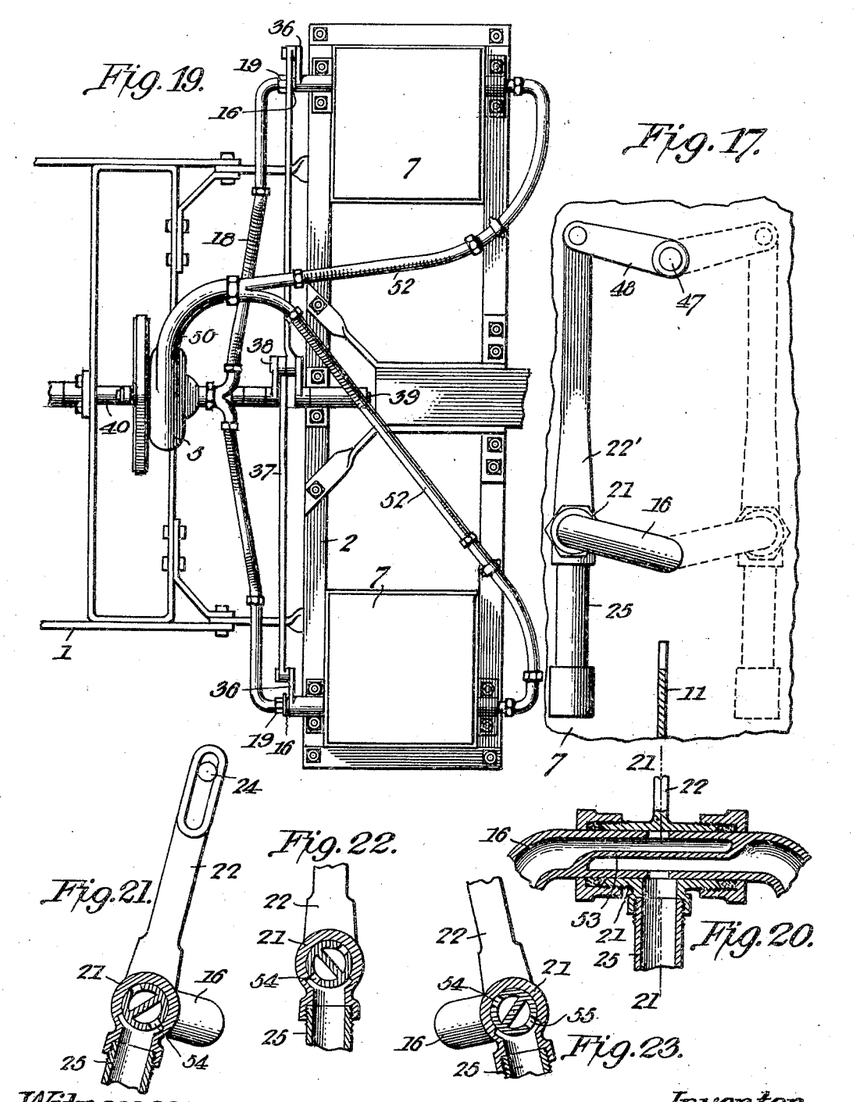
Fig. 17 is a sectional elevation illustrating modified guiding means for the pick-up finger.
Fig. 19 is a plan view of the runner-frame and a portion of the wheel-frame of a corn-planter, illustrating a modification of the invention.
Fig. 20 is a sectional detail view of the crank forming the suction and blast tube under said modification.
Fig. 21 is a transverse sectional view of the valve mechanism shown in Fig. 20 on the line 21 21.
Figs. 22 and 23 are similar views illustrating the parts in different positions.

In the construction shown in Fig. 17 an auxiliary rock-shaft 47 is placed immediately above and in the vertical plane of the rock-shaft 16, and the arm 22' of the pick-up member is extended upward and is connected to a rocker-arm 48, carried by the upper rock-shaft, the two rock-shafts serving to maintain the pick-up member constantly in a vertical position as it moves from the reservoir over the wall to a position above the top of the seed-tube. The operation otherwise is the same as that previously described.

In the construction shown in Fig. 18 the pick-up member 49 is in the form of a gooseneck that extends up to one side of the wall 11 and is provided with an aperture at one end in order that it may select and carry a seed in the manner previously described. The gooseneck 49 is moved vertically and at the upper limit of its movement is turned from a position over the reservoir to a position over the seed-tube, (see dotted lines in Fig. 18,) the seed being discharged at the latter point.

It is obvious that various means may be employed for equalizing the pressure in such a manner as to effect the discharge of the seed, and in place of employing a simple air-vent the equalization of pressures may be hastened by changing the direction of flow of the current of air—i. e., by directing a blast of air either at or above atmospheric pressure between the pick-up members in a direction opposite to the direction of the current of air under suction.

In Figs. 19 and 20 is illustrated a mechanism by which the direction of flow of the current of air may be governed, the outlet 50 of the fan being connected by flexible tubes 52 to that end of the rock-shaft opposite to the point of connection of the suction-tubes 18. In this case the hollow crank is provided with a partition 53, dividing it into two chambers, one of which communicates with the suction side of the fan and the other with the blast side, and the wall of the crank is provided with a pair of ports 54 and 55, either of which may be placed in communication with the pick-up member. When the ports are in the position shown in Fig. 21, the interior of the pick-up member is in communication with the port 54 and with the suction side of the fan, so that a seed may be picked up from the reservoir, and this continues while the ports move to the position shown in Fig. 22. During the movement from the position shown in Fig. 22 to that shown in Fig. 23 the positions of the ports are gradually shifted until at the latter point the interior of the pick-up member is in communication with the port 55, and a blast of air is directed through said port to the interior of the pick-up member and positively forces the seed from the end of said pick-up member.

Figures 24, 25, 26, 27, 28, 29, 30:
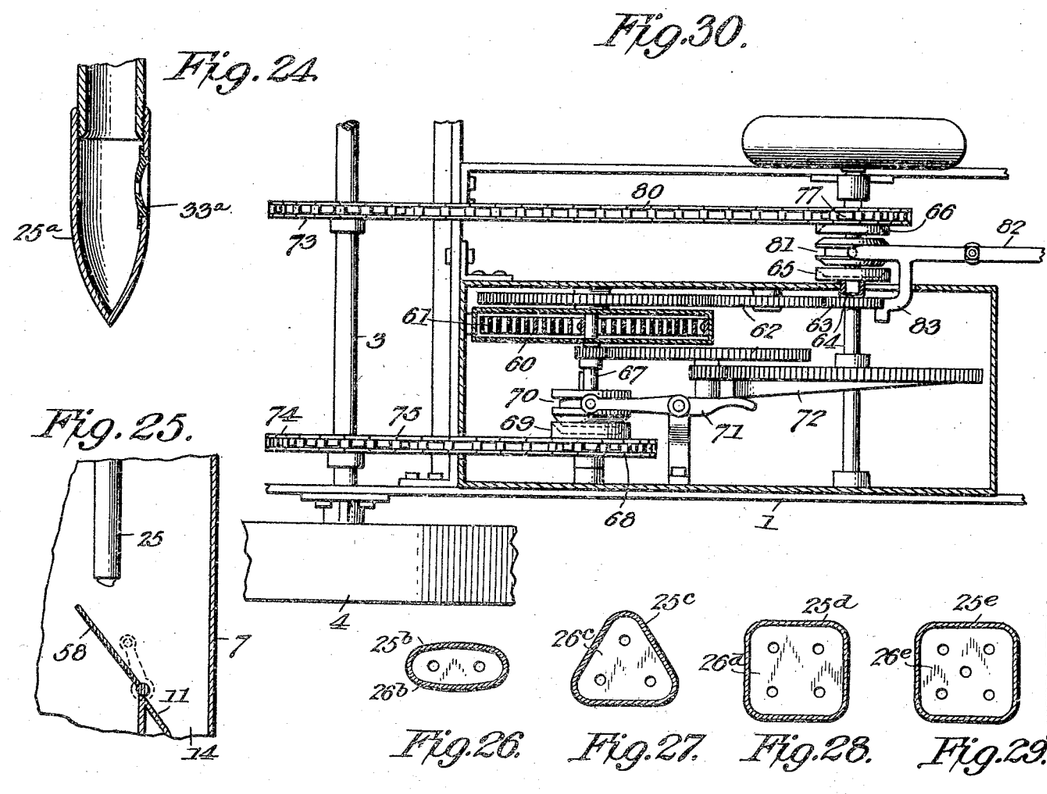
Figs. 24 and 25 illustrate further modifications of the pick-up mechanism.
Figs. 26, 27, 28, and 29 are detail views of still other modifications of the pick-up fingers.
Fig. 30 is a detail view of a spring-motor wound by the forward movement of the machine and storing power for driving the fan while the machine is stopped.

In Fig. 24 is illustrated a further modification of the pick-up. In this case the pick-up finger 25ª is closed at the end and preferably is pointed to facilitate its entrance into the mass of seed. At one side of the finger, facing the side wall 11 of the hopper, is an opening covered by an apertured diaphragm 33ª. On the descent of the finger a seed is caught and held by suction at the aperture, and when the finger is elevated so that the diaphragm is above side wall 11 the direction of flow of the current of air is reversed, and the seed is forced outward by a blast and driven over such side wall to the top of the seed-tube.

In Fig. 25 is shown a further modified form in which the finger receives merely a vertical movement and when raised a flap 58 is moved thereunder and forms an inclined chute to direct the seed over the side wall 11 and onto the seed-tube. This flap may be manipulated in any manner from a moving part of the mechanism, the particular means employed forming no part of the present invention.

In cases where it is desired to pick up simultaneously a plurality of seeds it may not always be necessary to employ a separate pick-up finger for each individual seed, as hereinbefore shown and described. When the segregating of a plurality of seeds from the bulk or mass of seeds is to be accomplished by a single pick-up finger, such finger will be made of sufficiently large cross-section to receive a diaphragm having two or more apertures or perforations, according to the number of seeds that it may be desired to pick up at any one operation. In Figs. 26, 27, 28, and 29 have been shown end views of pick-up fingers, (here designated 25ᵇ, 25ᶜ, 25ᵈ, and 25ᵉ, respectively,) the same being provided with diaphragms 26ᵇ, 26ᶜ, 26ᵈ, and 26ᵉ, the same being provided, respectively, with two, three, four, and five apertures adapted to segregate and to pick up a corresponding number of seeds. This construction may under some circumstances be found advantageous.

In most seeders the seed-dropping mechanism is thrown out of gear when the machine arrives at the end of each row and remains idle while the machine is being moved to and fro in adjusting it to proper position for commencing the planting of the next row. In the present pneumatic seeder it may be advisable in some cases to maintain the suction means in continuous operation during this interval in order that the suction may be sufficient to start its work when required. To this end, a spring-motor 60 is placed on the frame of the machine and power is stored during the running of the machine for the purpose of driving the fan while the machine is being adjusted.

The motor 60 comprises a motor-spring 61 and a suitable gear-train 62, the final gear 63 of which is mounted on a hollow shaft 64, arranged on the fan-shaft 66, and to the hollow shaft is secured a clutch-disk 65. The inner end of the spring is secured to a winding-shaft 67, on which is a loose sprocket-wheel 68 and a clutch-disk 69. To the shaft is feathered a clutching-sleeve 70 under the control of a lever 71, that is moved by a cam 72 on one of the gears. The main axle has two sprocket-wheels 73 and 74, the latter of which is connected by a link belt 75 to the sprocket-wheel 68, and when the clutch-disk 70 is moved into engagement with the normally loose disk 69 the motor-spring will be wound, and the winding will continue until the spring is fully wound, at which time cam 72 will automatically shift lever 71 and the clutches will be disconnected, allowing the disk 69 to rotate idly until the spring requires rewinding, at which time the cam will again shift the lever and the clutch members will be reengaged. On the fan-shaft 66 is a loose sprocket-wheel 77, one side of which forms a clutch-disk, and said wheel is driven from the wheel 73 by means of a link belt 80. Between the clutch-disk of the sprocket-wheel and the disk 65 the fan-shaft carries a clutch-sleeve 81, that is feathered to the shaft and is under the control of a manually-operable lever 82, and said lever also carries a motor-locking arm 83.

While the machine is running and a row is being planted the clutch-sleeve 81 is engaged with the clutching member of sprocket-wheel 77, so that the fan is driven so long as the machine continues to run. When the end of a row is reached, the driver operates lever 82 and throws the clutch-sleeve into engagement with the disk 65 and at the same time unlocks the motor, so that the latter will drive the fan during the time the machine is being adjusted to position to start a fresh row.

As will be seen from the foregoing description, this invention will be thoroughly effective to separate a charge of any desired size from the bulk of seeds contained in a receptacle and to convey the said charge to a seed-tube, through which it is conveyed to the place of deposit in the ground. The separation of the seeds constituting the charge from the mass or bulk is performed by segregating from the said mass or bulk individual seeds by means which will preclude the possibility of more or less than the precise number desired being separated at any one operation of the device. This efficiency of operation is brought about in the simplest possible manner, and the mechanism utilized is not only simple and effective in operation, but is capable of being constructed by a very moderate expense.

Having thus described my invention, what I claim, and desire to secure by Letters Patent, is—

1. A reciprocatory pneumatic seed pick-up.
2. A seed pick-up operating in the direction of its length and serving by engagement with a mass of seed to separate a single seed therefrom.
3. A pneumatic seed pick-up operating in the direction of its length to separate a single seed from a mass of seeds.
4. A suction-finger terminating in a seed pick-up and operating in the direction of its length to separate a single seed from a mass of seeds.
5. A pneumatic seed pick-up movable in the direction of its length to a receiving and to a discharging position.
6. A reciprocatory pneumatic seed pick-up movable bodily into and from a seed-reservoir.
7. A reciprocatory seed pick-up having a terminal suction inlet-opening.
8. A reciprocatory seed pick-up having a terminal suction inlet-opening, movable bodily into and from a seed-reservoir.
9. A seed pick-up comprising a suction-tube having an apertured diaphragm.
10. A seed pick-up comprising a suction-tube having an apertured wall, and means for thrusting such wall directly into a mass of seed.
11. A seed pick-up comprising a suction-tube having a yieldable apertured diaphragm.
12. A seed pick-up comprising a suction-tube having a plug including a yieldable apertured diaphragm.
13. A seed pick-up concaved at its outer end and provided with a suction inlet-opening.
14. A seed pick-up comprising a suction-tube having a yieldable apertured diaphragm, the outer face of which is concave.
15. A seed pick-up comprising a suction-tube provided with a plug including a yieldable apertured diaphragm, the outer face of which is concave.
16. A seed pick-up comprising a suction-tube having a yieldable diaphragm reduced in thickness toward the center and provided with an aperture in the reduced portion thereof.
17. A reciprocatory seed pick-up having a terminal suction inlet-opening, and a guard surrounding the opening.
18. A reciprocatory seed pick-up having a terminal suction inlet-opening, and a flange surrounding and extending below the opening.
19. A seed pick-up comprising a suction-tube provided with an apertured diaphragm and with a protective flange extending around the aperture.
20. A seed pick-up comprising a suction-tube provided with a yieldable apertured diaphragm and with a wear-resisting flange extending beyond said diaphragm.
21. A suction-tube having interchangeable single and plural pick-up fingers.
22. A suction-tube having interchangeable single and plural pick-up fingers provided with inlet-openings at their outer ends.
23. A suction inlet-tube and interchangeable pick-up fingers having apertured diaphragms at their outer ends.
24. A suction inlet-tube having interchangeable fingers, each provided with a suction inlet-opening and a guard-flange surrounding the opening.
25. A seed-reservoir, means for maintaining a constant level of seed therein and a pneumatic means for selecting and conveying single seeds from the reservoir.
26. A seed-reservoir, means for maintaining a constant level of seed therein, a pneumatic pick-up finger, and means for moving said pick-up finger into and from the reservoir.
27. A seed-reservoir, means for maintaining a constant level of seed therein, a suction inlet-tube, and interchangeable single and plural pick-up fingers carried by the tube and movable into and from said reservoir.
28. A seed-reservoir, means for maintaining a constant level of seed therein and a seed pick-up movable at each operation a predetermined distance below such level.
29. A seed-reservoir, means for maintaining a constant level of seed therein and a pneumatic pick-up finger having an outward movement to a predetermined distance below such level and movable upward and from the reservoir to discharge the seed.
30. In combination, a reservoir, a seed-tube and means for conveying the seed from the reservoir to a point approximately in the plane of the vertical axis of the tube.
31. A seed pick-up having means for retaining the seeds in position by atmospheric pressure and means for equalizing the pressure around the seed to permit its discharge from the pick-up.
32. A seed pick-up member and means for causing the flow of currents of air alternately in opposite directions through said member.
33. A seed pick-up having an opening at its outer end, and means for inducing the flow of a current of air through the pick-up in one direction for raising the seed and in the opposite direction for discharging the seed.
34. In combination a reservoir, a seed pick-up movable into and from the reservoir, means for inducing the flow of a current of air through the pick-up in one direction while in the reservoir, and in the opposite direction when the pick-up is moved from the reservoir.

35. A hollow ported crank-shaft constituting a suction-tube, and a pick-up finger mounted thereon.

36. A hollow ported crank-shaft constituting a suction-tube, and a pick-up finger pivotally mounted thereon.

37. A hollow ported crank-shaft constituting a suction-tube, a valve-casing mounted thereon, and a pick-up finger carried by the valve-casing.

38. A hollow ported crank constituting a suction-tube, a valve-casing mounted thereon and coöperating with the port and controlling the flow of air, and a seed pick-up finger carried by the valve-casing.

39. A hollow ported crank constituting a suction-tube, a valve-casing pivotally mounted thereon and coöperating with the port to control the flow of air, a seed pick-up finger carried by the valve-casing, and means for controlling the movement of the pick-up finger.

40. A hollow ported crank constituting a suction-tube, a valve-casing mounted thereon and coöperating with the port to control the flow of air, a seed pick-up finger carried by the casing, and a pick-up guiding-arm secured to said casing.

41. A hollow ported crank constituting a suction-tube, a valve-casing mounted thereon and coöperating with the port and controlling the flow of air, a seed pick-up finger carried by the casing, a slotted arm secured to the casing, and a stationary member entering the slot and controlling the movement of the pick-up finger.

42. In a seeding-machine, a hollow ported crank having a partition dividing it into suction and blast tubes, and a pick-up finger supported by the crank, the ports alternately communicating with the finger to direct the course of the currents of air therethrough.

43. In a seeding-machine, a hollow crank having a partition dividing the same into suction and blast tubes, the wall of said crank being provided with ports, a valve-casing extending around the ports, and a hollow pick-up finger carried by the valve-casing and arranged to communicate alternately with said ports.

44. In a seeding-machine, a hollow crank, a partition arranged therein and dividing the crank into suction and blast tubes, a reservoir, a pick-up finger supported by the crank and movable into and from the reservoir, and a valve mechanism automatically controlled by the position of the pick-up finger for placing such finger in communication with either the blast or the suction tube.

45. In combination, a seed-reservoir, a hollow ported crank constituting a suction-tube, a hollow pick-up finger movable by said crank into and from the reservoir, and means automatically controlled by the position of the finger for opening and closing communication between said finger and the crank.

46. In a pneumatic seeder, a suction means, and means operable from the running-gear for effecting continuous operation of the suction means during the various intervals of running and stopping of the machine.

47. In a pneumatic seeder, a suction means, means operable from the running-gear for driving the suction means while the machine is running and an intermittently-operable motor for driving the suction means between intervals of operation of the machine.

In testimony that I claim the foregoing as my own I have hereto affixed my signature in the presence of two witnesses.

WILLIAM BAGGER.

Witnesses:
    JNO. E. PARKER,
    J. H. JOCHUM, Jr.